United States Patent [19]

Farelli

[11] 3,998,353
[45] Dec. 21, 1976

[54] SECURITY CAP FOR THE FUEL FILLING CONDUIT OF A MOTOR VEHICLE

[76] Inventor: Mario Farelli, C. so Giulio Cesare 298, Turin, Italy

[22] Filed: Feb. 10, 1975

[21] Appl. No.: 548,709

[30] Foreign Application Priority Data

Feb. 11, 1974 Italy .................................. 67371/74
Oct. 16, 1974 Italy .................................. 70079/74

[52] U.S. Cl. .............................. 220/210; 70/167; 70/379 R; 220/86 R
[51] Int. Cl.² .................................... B65D 55/14
[58] Field of Search ............ 70/168, 169, 170, 163, 70/173; 220/210, 86 R

[56] References Cited

UNITED STATES PATENTS

| 490,356 | 1/1893 | Luce | 220/210 |
|---|---|---|---|
| 1,701,816 | 2/1929 | Malluk et al. | 220/210 |
| 1,885,547 | 11/1932 | Rider | 70/168 |
| 2,375,671 | 5/1945 | Malluk | 70/168 |
| 2,747,763 | 5/1956 | Sach | 220/210 |
| 3,126,728 | 3/1964 | Nehls | 70/169 |
| 3,402,580 | 9/1968 | Speck | 70/169 |

FOREIGN PATENTS OR APPLICATIONS 237,994  5/1924  United Kingdom ................ 70/168

Primary Examiner—William Price
Assistant Examiner—Allan N. Shoap
Attorney, Agent, or Firm—Alan H. Levine

[57] ABSTRACT

A security cap for the filler conduit of a motor vehicle fuel tank including a lock body provided with a key-operable latch. The lock body is completely accommodated within the upper end of the filler conduit, and locked in place beneath the conventional screw cover of the conduit. The upper face of the lock body is smooth and unbroken, and provided with a key slot.

9 Claims, 17 Drawing Figures

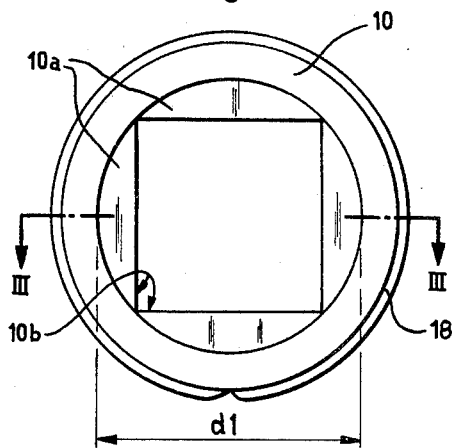
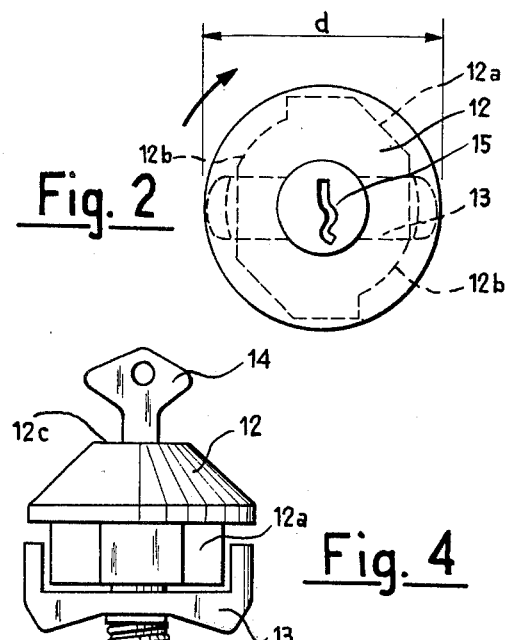
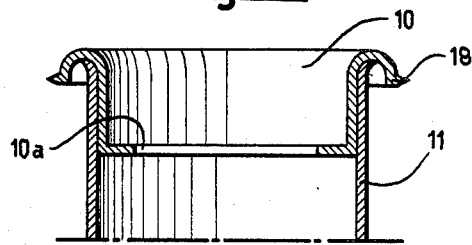
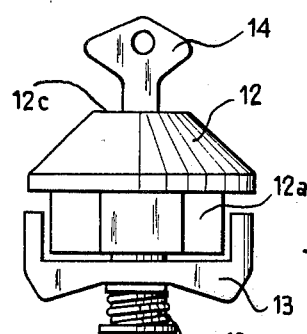
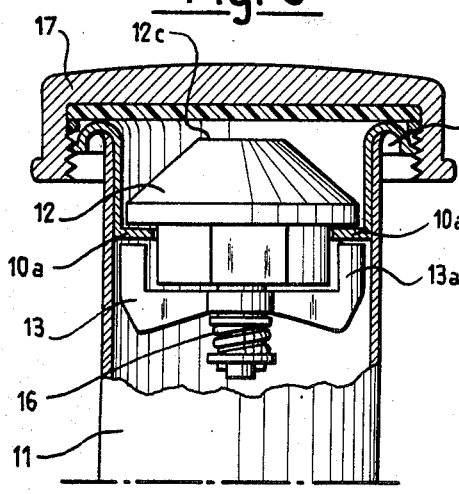
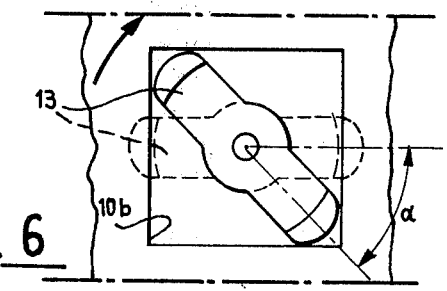
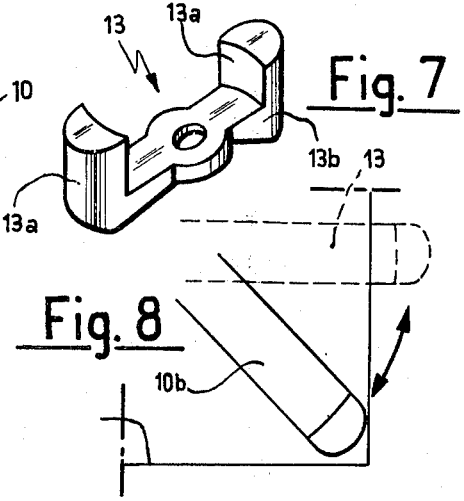
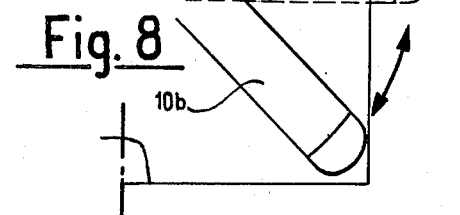

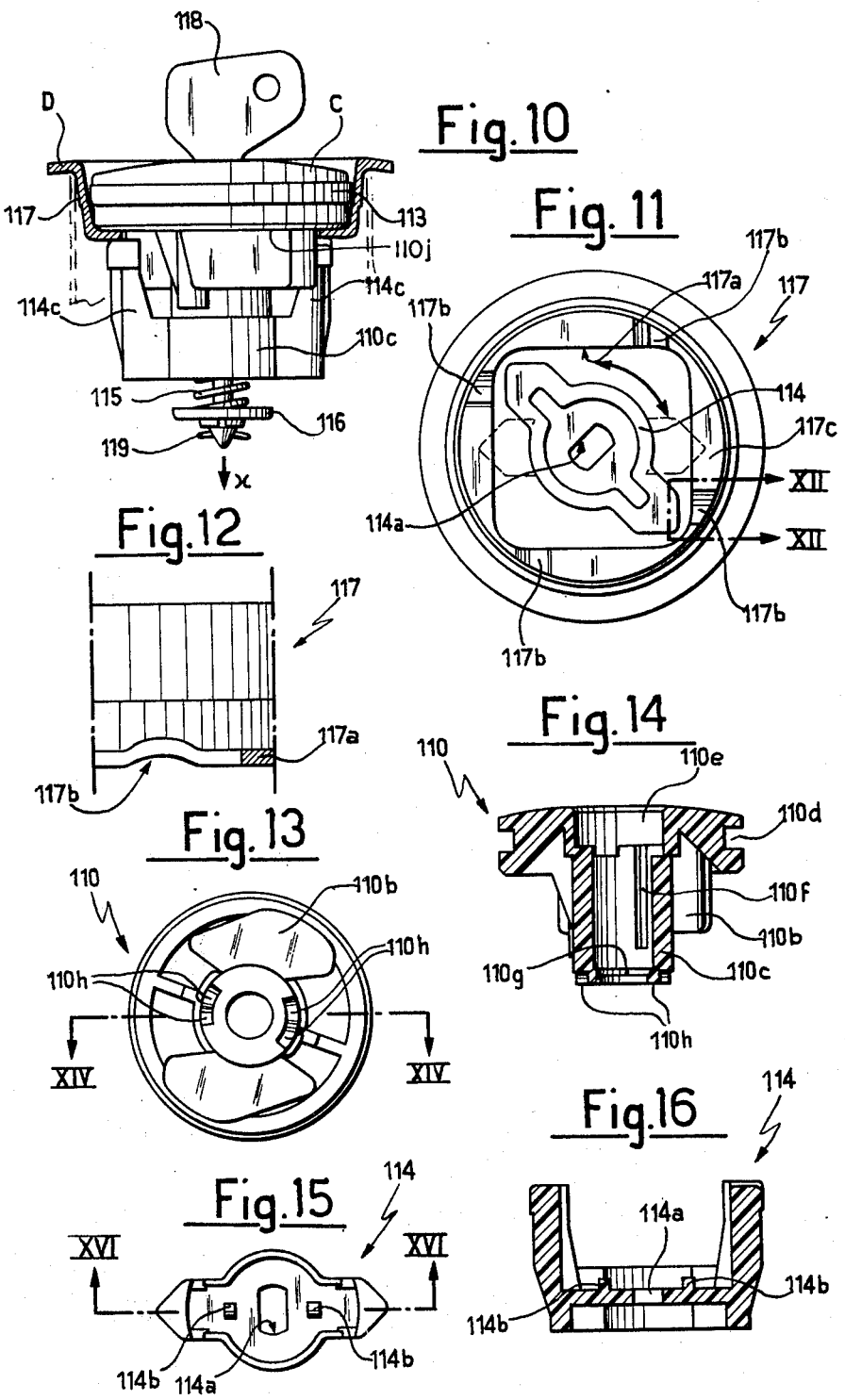

SECURITY CAP FOR THE FUEL FILLING CONDUIT OF A MOTOR VEHICLE

It is known that fuel tanks mounted on motor vehicles, in general, are provided with a conduit branch protruding at any external point of the vehicle body and are closed at the end of said branch by a screw cap.

In some cases, the terminal screw cap is also provided with a lock in order to prevent access to the tank to anybody who is not provided with the corresponding key.

In many types of motor vehicles, the terminal cap of the conduit, leading to the fuel tank or tanks, is directly located on the outside of the body; in other cases, the end of the filling conduit, closed by the corresponding cap, terminates within a recess controlled by a scuttle which may or may not be provided with a lock.

All the arrangements known at the present time have some drawbacks which may be summarized as follows:

In the case of screw caps provided with a lock and protruding directly on the body outside surface, the lock being exposed to the external elements, particularly during the winter season, is subject to operation defects caused by jammings which often make opening difficult.

Analogous troubles occur with the caps located within a recess controlled by a scuttle which does not prevent the penetration of atmospheric dust and which, if provided with a lock, are subject to the same troubles as the external caps.

Further, threaded caps, even if provided with a lock, are very vulnerable as, with strong plumber pliers, they can be forced and removed without using the key.

Consequently, from the foregoing it can be seen clearly that screw caps, used at the present time to close the filling conduit of the fuel tank on motor vehicles, in general, do not give any surety against access to the tanks and hence against the unauthorized withdrawing of fuel from same.

The considerations set forth above are valid even in the cases where the filling conduits provided with terminal caps appear within the front or the rear hood; the fact is more evident in the usual cases where private motor vehicles, particularly during the night are parked in public garages where it is obligatory to leave the starting and door keys which generally control all the other body locks.

The main object of the present invention is to provide a security cap, which may or may not cooperate with the conventional screw cap, which may be terminally inserted with respect to the filler conduit of each tank and having a key different from the other keys of the vehicle, and therefore only removable by the use of the corresponding key, in order to prevent in any circumstances, unauthorized access and hence the theft of fuel contained in the tank or tanks of a motor vehicle.

With the aforesaid in view as well as other objects described later, the security cap according to the invention, which may or may not comprise the known screw cap, is characterized by being provided with a lock body which may be inserted in the mouthpiece of the filling conduit branch, within and with respect to a collar having an inner hole with a polygonal perimeter integral with the inner skirt of the filler, which receives a tang of said lock body and acts as the retaining member for the latch, or latches, of same.

Another particular feature of the security cap according to the invention, resides in the fact that the cap, when seated in its position of use, is recessed within the filler conduit and therefore non-removable with the aid of special pliers or keys.

Additional particular features of the cap according to the invention will be seen from the following specification which refers to the accompanying illustrative drawings, wherein:

FIG. 1 shows, in a top plan view, the end of the filler conduit for fuel tanks of motor vehicles, according to the invention;

FIG. 2 also in a top plan view, shows the lock body which may be inserted within the filler of FIG. 1;

FIG. 3 is an elevational view of the FIG. 1 filler, partially sectioned along lines III—III of FIG. 1;

FIG. 4 shows the lock body of FIG. 2, in a side view;

FIG. 5 is a longitudinal cross section of the complete filler provided with the cap and the lock body;

FIG. 6 is a diagrammatic detail showing the positions which may be assumed by the latch;

FIG. 7 is a perspective view of a preferred shape of the latch;

FIG. 8 is a detail of FIG. 6;

FIG. 10 is a side view of the cap in its position of use;

FIG. 11 is a plan view of same, from below;

FIG. 12 is a partial section along a plane passing through line XII—XII of FIG. 11;

FIG. 13 is a plan view, from below, of the cap body, without the lock cylinder and the latch;

FIG. 14 is a longitudinal section view of the FIG. 13 body, along a plane passing through line XIV—XIV of FIG. 13;

FIG. 15 is a plan view of the latch, in the direction of arrows XV—XV of FIG. 9; and FIG. 16 is a section of same latch along line XVI—XVI of FIG. 15.

Figure 9:
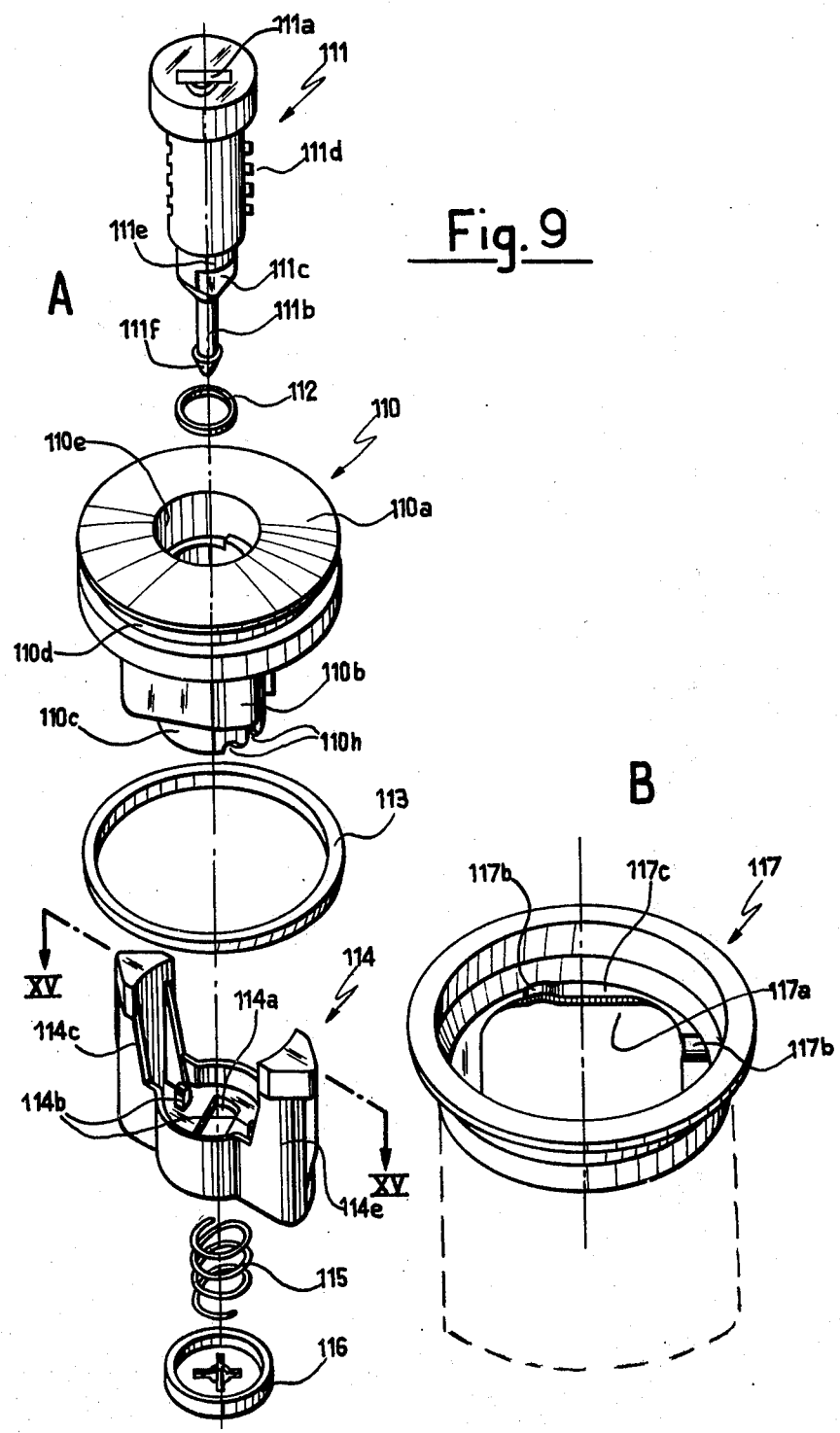
FIG. 9A is a perspective exploded view of the component parts of the cap according to a variant.
FIG. 9B shows, also in perspective, the terminal of the filler designed to receive the cap shown in FIG. 9A.

Stating in advance that the applicant is the owner of the Italian Patent No. 912,051 and Italian Patent Application No. 69431-A/72 of the first Additional Patent, having as their subject matter a tubular filler with a particular structure provided with a terminal bush having a perimetrical edge forming a screw thread, said bush is indicated by 10 in the accompanying drawing and is welded to the filling conduit 11.

According to the subject matter of the invention, the bush 10 is cup-shaped, namely, it is provided with a bottom wall 10a having a polygonal-shaped aperture 10b, which is preferably square, as represented on the drawings but it could have any other suitable polygonal profile.

The aperture 10b of the terminal bush 10 is designed to receive the quadrangular prismatic projection 12a of the lock body 12 provided with latch 13 having two opposite branches which may be angularly moved by control (FIG. 6) through an angle of an amplitude equal to 45°, by rotating the key 14 inserted in the seat 15 (FIGS. 2 and 4). The upper part of the lock body 12 is shaped substantially as a truncated cone and its larger base presents a diameter $d$ slightly smaller than the inner diameter $d_1$ of bush 10.

The prismatic projection 12a presents two chamfered corners 12b; said chamfered corners are located diagonally opposite one another. A spring 16 has the function of elastically pressing the latch 13 against the base of projection 12a. The chamfered corners 12b allow the rotation of the cranks 13b of latch 13, as shown in detail in FIG. 8.

The use of the security cap described will be apparent:

By suitably operating the key 14 and driving the latch 13 to the position shown by solid lines in FIG. 6, namely, to the position of the diagonal alignment with respect to the projection 12a of the lock body 12, the latter is mounted on the top of the filler 10 as shown in FIG. 5 and, by rotating the key again in the direction opposite to the first, the ends 13a of the latch engage the flange 10a of the bush 10 bottom. Then, the key 14 is extracted and the cover 17, which engages by screwing the helicoidal edge 18, is screwed on to the top of the filler 10.

As shown in FIG. 5, the top 12c of the lock body 12 is below the upper edge of bush 10. In addition, the conical skirt of body 12 presents no points which may be seized by pliers, tongs, or other breaking tools, and therefore it may be only removed by using the corresponding key 11, by means of which the latch 13 is rotated from the closed position shown in FIG. 5 and, in dotted lines in FIGS. 6 and 8, to the open position shown in solid lines in FIGS. 6 and 8.

According to a variant, the cap is mounted in a protruding position on the filler which is located, in turn, non-protruding with respect to any suitable location of the outer surface of the vehicle body. Th cap is further provided with watertight and dust-tight gaskets and therefore it is not necessary to protect it further with the known screw cover.

The elimination of the terminal screw cover reduces the cost of the closure members of the filler and further it simplifies the closing and opening maneuvers of the same.

With reference to FIGS. 9 to 16, the cap is formed by a body 110 comprising a flange 110a, having a downwardly facing surface 110j (FIG. 10), integral with a profiled tang forming a pair of symmetrical radial projections 110b and a cylindrical terminal part 110c. In the edge of flange 110a there is a perimetrical groove 110d designed to receive the elastic annular gasket 113. The body is provided with the axial seat 110e designed to receive the lock cylinder 111, provided with slot 111a for the key 118 (FIG. 10). Said slot 111a, is closed, as known, by a tongue which is elastically pushed to the closed position of slot 111a when the key is withdrawn. The lock cylinder 111 is further provided with an extension 111b integral with the cylinder and having an appendix 111c shaped as a sunk key suitable to penetrate and be sunk in the corresponding seat 114a formed in the bottom of latch 114. 111d indicates the teeth of cylinder 111 which, as known, are controlled in the retracted position by the profile of the corresponding key 118.

As illustrated in FIG. 14, the hollow seat 110e formed in the body 110 has a variable profile, and presents the longitudinal groove 110f within which the teeth 111d of cylinder 111 are accommodated when the lock is being closed and key 118 withdrawn. Seat 110e also presents the seat 110g to retain the annular elastic gasket 112 which is mounted, upstream with respect to the sunk key 111c of cylinder 111, on reduced diameter section 111e immediately under the greater diameter of cylinder 111.

The latch 114 is formed by a substantially U-shaped bracket, provided at its bottom with the seat 114a for the sunk key and a pair of longitudinal teeth 114b (FIGS. 9, 16) designed to cooperate as cams with the undulated front profile 110h provided on the terminal edge of tang 110c (FIGS. 9 and 10). The teeth 114b and the profile 110h are equidistant from the rotation axis of cylinder 111.

The assembling order of the various components of the cap is illutrated in FIG. 9: the annular elastic gasket 112 is fitted on the neck 111e of cylinder 111 and said cylinder is then inserted in the seat 110e of body 110. The end of said cylinder comprising parts 111c, 111b protrudes from the terminal part 110c of body 110. The hollow seat 114a of latch 114 is sunk in the key-like seat 111c with the branches 114c of latch 114 facing towards flange 110a (see FIG. 10); the spring 115 is threaded on the cylindrical tang 111b and the retaining washer 116 having a central cross-shaped unthreaded slot is pushed on to the arrow shaped conical end 111f of tang 111b. A transverse pin 119, FIG. 10, is inserted in a corresponding hole of the end 111f in order to assure the assembled stability of the parts described.

The cylindrical spring 115, which reacts against the bottom of latch 114 and against the surface of the cup-shaped washer 116, exerts an elastic traction on the cylinder 111 and thereby presses the elastic ring 112 against the seat 110g of body 110. In these conditions, tightness between the cylinder 111 and the body 110 is assured. The filler conduit for access to the fuel tank of the motor vehicle terminates with the collar 117 which is provided with an inner radial flange 117c which has a quadrangular opening 117a with rounded corners. Further, the edge of said flange presents four recesses 117b, FIGS. 9B, 11, and 12, shaped as shallow grooves located at such positions as to be immediately after the vertices of the quadrangular seat 117a, in the clockwise direction, namely, in the closing rotating direction of the key 118 and the cylinder 111. The concavity of said grooves or recesses 117b is directed upwardly with respect to the assembly, that is, towards the key 118.

The cap, seated in its position of use, is shown in FIG. 10, and its operation is as follows:

The cap, with the key 118 inserted in its slot 111a, is inserted in the collar 117, which forms the terminal of the filler, with the latch 114 rotated in the open position, as shown in solid lines in FIG. 11.

For closing, the key is rotated in the clockwise direction (counterclockwise direction with reference to FIG. 11) thereby rotating cylinder 111 and hence latch 114. During the initial rotation of the latch, the upper ends of the branches 114c enter a pair of diagonally opposed recesses 117b (FIGS. 11 and 12), and hence easily move beneath the flange 117c of collar 117. During further rotation of the latch 114, by continued rotation of the key 118 and cylinder 111, teeth 114b projecting upwardly from the latch cooperate with cam surface 110h facing downwardly on the lower face of tang 110c. As a result, the rotating latch also moves axially downwardly away from flange 110, spring 115 being compressed during this equal movement. This downward movement of latch 114 moves the upper ends of branches 114c away from the flange 117c, so that there is no frictional resistance to rotation of latch 114 which would otherwise be present if the upper ends of branches 114c rubbed against the lower face of flange 117c during rotation. Upon completion of the rotation of the key, cylinder, and latch, the latch 114 will be in the position shown in broken lines in FIG. 11. The contour of cam surface 110h is such that during the last portion of the rotation, spring 115 is permitted to move latch 114 upwardly, and the upper ends of branches 114c engage the lower face of flange 117c. Consequently, spring 115, which produces a force on cylinder 111 and hence on cap body 110 in the direction of arrow x in FIG. 10, causes the gasket 113 surrounding flange 110a to be compressed tightly against the inner surface of collar 117, and causes the gasket 112 to be tightly compressed between the cylinder 111 and the seat 110g (FIG. 14) of body 110. The gaskets 112 and 113 insure a liquid tight fit between the cap and the filler conduit.

The opening maneuver is made easily and without effort due to the presence of the latch teeth 114b cooperating, as described for the closing maneuver with the frontal cam profile 110h of body 110.

As shown in FIG. 10, the swelled surface C of the cap does not protrude at all from the edge D of the filler end 117 and therefore, without the key, the cap can in no way be removed.

From the above specification the particular features of the cap according to the invention and the advantages derived from its use appear clearly and may be summarized as follows:

access to the tank without the use of the key is impossible;

impossibility of forcing removal of the cap, which is recessed within the cup-shaped collar 117 while said collar is mounted with its outermost edges at the same level as the surrounding surface in any appropriate part of the vehicle body;

complete absence of any external projection which could be impractical and unaesthetic;

simplicity of use of the cap;

relatively low manufacturing cost of the cap, particularly if related to the actual cost of the fuel for motor vehicles;

perfectly tight sealing of the cap against water, and atmospheric agents in general; and economical production of the whole assembly wherein the greatest number of elements may be obtained by molding.

The invention has been shown and described in preferred form only and by way of example, and many variations may be made in the invention which will still be comprised within its spirit. It is understood, therefore, that the invention is not limited to any specific form or embodiment except insofar as such limitations are included in the appended claims.

What is claimed is:

1. A security cap for the fuel filling conduit of a motor vehicle, the fuel filling conduit having an inwardly directed flange surrounding a non-circular opening, said security cap comprising a body (110) having a flange (110a) presenting a downwardly facing surface (110j), a tang (110c) depending from said flange, cam surface means (110h) projecting downwardly from said tang, and an opening (110e) extending through said flange and tang, a lock cylinder (111) within said opening and having an extension (111b, 111c) extending below the bottom of said tang, said cylinder being rotatable within said opening through a limited angle between an open position in which the cap is removable from the filling conduit and a closed position in which the cap is not removable, an elongated latch (114) carried by said cylinder extension and rotatable therewith about the same axis, said latch being axially aligned with said body flange surface, and said latch fitting through the opening in the filling conduit flange when in one position of rotation corresponding to the open position of said cylinder and said latch not fitting through that opening in another position of rotation corresponding to the closed position of said cylinder, the filling conduit flange being gripped between said latch and said body flange when said cylinder is in its closed position, and said latch being movable axially of said extension, spring means (115) urging said latch axially of said extension toward said flange, and follower tooth means (114b) projecting upwardly from said latch and cooperable with said cam surface means for moving said latch axially away from said flange surface, against the force of said spring means, during rotation of said locking cylinder and latch between said open and closed positions of said cylinder so as to reduce the frictional engagement between said latch and the filling conduit flange during rotation of said latch between its positions of rotation corresponding to the closed and open positions of said lock cylinder.

2. A security cap as defined in claim 1 including an upwardly facing seat (110g) within said opening, a downwardly facing shoulder surrounding said lock cylinder, and a resilient gasket (112) surrounding said lock cylinder and positioned between said seat and shoulder, said spring means urging said seat and shoulder toward each other to squeeze said gasket between them.

3. A security cap as defined in claim 1 in combination with a filling conduit terminal collar (117) having a frusto-conical side wall and an inwardly directed flange (117c), and including a resilient gasket (113) surrounding and projecting radially from said body flange (110a, said spring means urging said flange and gasket downwardly, when said locking cylinder is in its closed position, to squeeze said gasket between said flange and said side wall.

4. A security cap as defined in claim 3 including a perimetrical groove (110d) in the edge of said body flange, said gasket being seated within said groove.

5. A security cap as defined in claim 1 including an enlargement (116) carried by said lock cylinder part beneath said latch, said spring being between said latch and enlargement and surrounding said part.

6. A security cap as defined in claim 1 in combination with a filling conduit terminal collar having an inwardly directed flange surrounding a quadrangular opening (117a), the distance between each pair of alternate corners of said opening being larger than the length of said latch and the distance between each pair of alternate sides of said opening being smaller than the length of said latch, whereby said latch may be inserted through said opening in four different angular positions with respect to said terminal collar.

7. A security cap as defined in claim 1 in combination with a filling conduit terminal collar having an outer end and an inwardly directed flange (117c) spaced downstream of said outer end, said latch being on the downstream side of said flange and said body flange (110a) being on the upstream side of said collar flange when the cap is closing the filling conduit, said body flange being entirely accommodated within the region between said collar flange and said collar outer end so that no part of said cap protrudes beyond said collar outer end.

8. A security cap as defined in claim 1 in combination with a filling conduit terminal collar having an inwardly directed flange surrounding a non-circular opening through which said latch is inserted when the filling conduit is to be closed, said opening having a larger dimension through which said latch can pass and a smaller dimension through which said latch can pass and a smaller dimension through which said latch cannot pass, and said flange having grooves (117b) in its lower surface between said larger and smaller dimensions of said opening.

9. A security cap as defined in claim 1 wherein all of said parts, except for said lock cylinder and spring means, are molded parts.

* * * * *